(12) United States Patent
Langford et al.

(10) Patent No.: US 6,236,301 B1
(45) Date of Patent: *May 22, 2001

(54) CANTILEVERED DEFLECTION SENSING SYSTEM

(75) Inventors: Gordon B. Langford, Sandy; Cesar A. Montano, Pleasant Grove; Greg A. Putnam, W. Jordan, all of UT (US)

(73) Assignee: Sensitron, Inc., Midvale, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,406

(22) Filed: Sep. 4, 1996

(51) Int. Cl.$^7$ ..................................... G01B 7/16
(52) U.S. Cl. .................... 338/6; 338/2; 338/47; 338/50; 338/260; 338/320; 338/210; 338/211; 73/862.34; 73/862.474; 73/862.627
(58) Field of Search ............... 338/2, 6, 47, 50, 338/99, 114, 209, 210, 211, 260, 320; 73/862.474, 862.627, 862.634

(56) References Cited

U.S. PATENT DOCUMENTS

| | | |
|---|---|---|
| Re. 32,003 | 10/1985 | Shoberg . |
| 3,174,125 | 3/1965 | Curby . |
| 3,229,511 | 1/1966 | Rossire . |
| 3,332,280 | 7/1967 | Fish et al. . |
| 3,393,566 * | 7/1968 | Green ........................................ 338/2 |
| 3,517,999 | 6/1970 | Weaver . |
| 3,541,491 | 11/1970 | Worster . |
| 3,820,529 | 6/1974 | Gause et al. . |
| 3,878,711 | 4/1975 | Randolph, Jr. . |
| 3,888,117 | 6/1975 | Lewis . |
| 3,895,288 | 7/1975 | Lampen et al. . |
| 3,958,455 | 5/1976 | Russell . |
| 3,968,467 | 7/1976 | Lampen et al. . |
| 3,971,250 | 7/1976 | Taylor . |
| 4,023,054 | 5/1977 | Taylor . |
| 4,038,867 | 8/1977 | Andrews et al. . |
| 4,123,158 | 10/1978 | Reyblatt . |

(List continued on next page.)

*Primary Examiner*—Karl D. Easthom
(74) *Attorney, Agent, or Firm*—Holme Roberts & Owen LLP

(57) ABSTRACT

A deflection sensing system for detecting deflection includes one or more deflection sensors between opposing sets of extensions. When one set of extensions is moved toward an opposing set of extensions, the deflection sensors are deflected. A preferred deflection sensor is a flexible potentiometer, which has a resistance that changes as the flexible potentiometer is deflected A flexible potentiometer includes a variable resistance material on a substrate. In a preferred system, the flexible potentiometer includes a cantilevered section, which is deflected about an extension with respect to the remainder of the flexible potentiometer, or with respect to a portion of the substrate not including the variable resistance material. A flexible potentiometer experiences less stress when in cantilevered form than when stretched between two extensions. In either case, the extensions may be joined to first and second corrugated plates. A particular application for the system is in a horn activator used in connection with an automobile air bag system. A corrugated plate may be adhered to the inside of a hub cover. Alternatively, the extensions may be adhered directly to the hub cover. Analyzing circuitry senses the resistance of a resistive grid including flexible potentiometers. The analyzing circuitry interprets a change in resistance to mean there has been a deflection. The analyzing circuitry may consider merely that there has been a change in resistance, or it may consider the amount of change in resistance. The analyzing circuitry may essentially simultaneously analyze the resistance of more than one resistive grid or deflection sensor.

10 Claims, 11 Drawing Sheets

U.S. PATENT DOCUMENTS

| | | |
|---|---|---|
| 4,152,304 | 5/1979 | Tadewald . |
| 4,191,470 | 3/1980 | Butter . |
| 4,235,141 | 11/1980 | Eventoff . |
| 4,252,391 | 2/1981 | Sado . |
| 4,258,100 | 3/1981 | Fujitani et al. . |
| 4,258,720 | 3/1981 | Flowers . |
| 4,268,815 | 5/1981 | Eventoff et al. . |
| 4,269,506 | 5/1981 | Johnson et al. . |
| 4,273,682 | 6/1981 | Kanamori . |
| 4,276,538 | 6/1981 | Eventoff et al. . |
| 4,301,337 | 11/1981 | Eventoff . |
| 4,306,480 | 12/1981 | Eventoff et al. . |
| 4,314,227 | 2/1982 | Eventoff . |
| 4,314,228 | 2/1982 | Eventoff . |
| 4,315,238 | 2/1982 | Eventoff . |
| 4,355,692 | 10/1982 | Ostrelich . |
| 4,414,537 | 11/1983 | Grimes . |
| 4,420,251 | 12/1983 | James et al. . |
| 4,423,640 * | 1/1984 | Jetter ................................. 73/862.65 |
| 4,429,580 | 2/1984 | Testa et al. . |
| 4,444,205 | 4/1984 | Jackson . |
| 4,451,714 | 5/1984 | Eventoff . |
| 4,461,085 | 7/1984 | Dewar et al. . |
| 4,489,302 | 12/1984 | Eventoff . |
| 4,503,705 | 3/1985 | Polchaninoff . |
| 4,542,291 | 9/1985 | Zimmerman . |
| 4,575,117 | 3/1986 | Uchida . |
| 4,605,593 | 8/1986 | Iida . |
| 4,639,711 | 1/1987 | Edholm et al. . |
| 4,649,784 | 3/1987 | Fulks et al. . |
| 4,703,335 | 10/1987 | Matsushita et al. . |
| 4,715,235 | 12/1987 | Fukui et al. . |
| 4,729,809 | 3/1988 | Dery et al. . |
| 4,745,301 * | 5/1988 | Michalchik ............................ 338/99 |
| 4,745,930 | 5/1988 | Confer . |
| 4,748,433 | 5/1988 | Jackson et al. . |
| 4,763,534 | 8/1988 | Hager . |
| 4,765,422 * | 8/1988 | Hoffmann ................................ 338/2 |
| 4,782,319 * | 11/1988 | Dell'Acqua et al. ..................... 338/4 |
| 4,786,764 | 11/1988 | Padula et al. . |
| 4,810,992 | 3/1989 | Eventoff . |
| 4,822,040 | 4/1989 | Raditic . |
| 4,837,548 | 6/1989 | Lodini . |
| 4,876,419 | 10/1989 | Lodini . |
| 4,968,965 | 11/1990 | Naitou et al. . |
| 4,979,763 | 12/1990 | Blackburn . |
| 5,065,322 | 11/1991 | Mazur et al. . |
| 5,086,652 | 2/1992 | Kropp . |
| 5,086,785 | 2/1992 | Gentile et al. . |
| 5,109,341 | 4/1992 | Blackburn et al. . |
| 5,134,248 | 7/1992 | Kiec et al. . |
| 5,142,915 * | 9/1992 | Bergstrom ............................. 338/47 |
| 5,157,372 | 10/1992 | Langford . |
| 5,172,790 | 12/1992 | Ishikawa et al. . |
| 5,202,281 | 4/1993 | Ishibashi . |
| 5,202,831 | 4/1993 | Blackburn et al. . |
| 5,216,607 | 6/1993 | Diller et al. . |
| 5,222,399 | 6/1993 | Kropp . |
| 5,232,243 | 8/1993 | Blackburn et al. . |
| 5,250,227 | 10/1993 | Margolin . |
| 5,265,904 | 11/1993 | Shelton et al. . |
| 5,265,905 | 11/1993 | Shelton . |
| 5,269,559 | 12/1993 | Filion et al. . |
| 5,269,560 | 12/1993 | O'Loughlin et al. . |
| 5,275,432 | 1/1994 | Pray et al. . |
| 5,287,757 * | 2/1994 | Polaert et al. ................... 73/862.627 |
| 5,297,976 | 3/1994 | VanDerStuyf et al. . |
| 5,309,135 | 5/1994 | Langford . |
| 5,313,023 | 5/1994 | Johnson . |
| 5,344,185 | 9/1994 | Cooke, II . |
| 5,350,189 | 9/1994 | Tsuchitani et al. . |
| 5,351,542 * | 10/1994 | Ichimura et al. ........................ 338/2 |
| 5,364,125 | 11/1994 | Brown et al. . |
| 5,366,242 | 11/1994 | Faigle et al. . |
| 5,369,232 | 11/1994 | Leonelli . |
| 5,371,333 | 12/1994 | Kanai et al. . |
| 5,383,473 | 1/1995 | Moberg . |
| 5,387,819 | 2/1995 | Ueno et al. . |
| 5,395,802 | 3/1995 | Kiyota et al. . |
| 5,396,439 | 3/1995 | Yamada . |
| 5,398,962 | 3/1995 | Kropp . |
| 5,399,819 | 3/1995 | Lang et al. . |
| 5,413,378 | 5/1995 | Steffens, Jr. et al. . |
| 5,419,176 | 5/1995 | Walker . |
| 5,423,227 * | 6/1995 | Polaert et al. ................... 73/862.044 |
| 5,423,569 | 6/1995 | Reighard et al. . |
| 5,439,249 | 8/1995 | Steffens, Jr. et al. . |
| 5,441,302 * | 8/1995 | Johnson et al. . |
| 5,443,284 * | 8/1995 | Strahl et al. . |
| 5,443,286 * | 8/1995 | Cunningham et al. . |
| 5,447,327 * | 9/1995 | Jarboe et al. . |
| 5,454,589 * | 10/1995 | Bosio et al. . |
| 5,454,591 * | 10/1995 | Mazur et al. . |
| 5,456,492 * | 10/1995 | Smith et al. . |
| 5,458,366 * | 10/1995 | Hock et al. . |
| 5,460,405 * | 10/1995 | Faigle et al. . |
| 5,470,105 * | 11/1995 | Rose et al. . |
| 5,474,328 * | 12/1995 | Nilsson . |
| 5,478,111 * | 12/1995 | Marchant et al. . |
| 5,480,185 * | 1/1996 | Lowe et al. . |
| 5,483,845 * | 1/1996 | Stein et al. . |
| 5,489,119 * | 2/1996 | Prescaro et al. . |
| 5,489,806 * | 2/1996 | Harris et al. . |
| 5,490,411 * | 2/1996 | Hogan . |
| 5,494,311 * | 2/1996 | Blackburn et al. . |
| 5,515,725 * | 5/1996 | Tabota et al. . |
| 5,531,472 * | 7/1996 | Semchena et al. . |
| 5,583,476 * | 12/1996 | Langford . |
| 5,608,172 * | 3/1997 | de Magalhaes Machado et al. ............... 73/862.541 |
| 5,625,333 * | 4/1997 | Clark et al. ............................. 338/2 |

* cited by examiner

CANTILEVERED DEFLECTION SENSING SYSTEM

BACKGROUND OF THE INVENTION

1. Field of the Invention

The invention relates to a system in which deflection sensors are arranged in a cantilevered arrangement. The invention has particular application for a horn activator used in connection with an automobile air bag system.

2. State of the Art

In the 1980's, automobile manufacturers began putting air bags adjacent to steering wheel hubs. FIGS. 1 and 2 show side and front views of a typical air bag system 10. Referring to FIGS. 1 and 2, air bag system 10 includes an air bag 12 between a rigid steering wheel hub 16 and an air bag hub cover 20. Hub 16, which is connected to steering wheel shaft 24, supports steering wheel 26 through supports 32A, 32B, 32C, and 32D.

When the automobile has a sudden impact, a pressure capsule 36 releases a burst of high pressure air into air bag 12. Air bag 12 is inflated in response to the burst. Hub cover 20 splits along a partially perforated line 38 under the force of air bag 12.

Referring to FIG. 3, a typical automobile horn control system 40 includes a horn actuator 42, which may comprise a movable element 44 and a stationary element 46. When the movable element 44 is pressed against the stationary element 46, an electrical path is completed causing an electrical signal to appear on conductor 48 between stationary element 46 and a horn control circuit 52. When the signal appears on conductor 48, horn control circuit 52 activates a horn 56 through a voltage from a power supply 58.

Horn actuators, such as horn actuator 42, have been placed in a variety of positions on the steering wheel and under or on the steering wheel hub cover. However, it has been found safest to position the horn actuators on or under the hub cover so that the driver may activate the horn with the palm of his hand or lower part of the palm of his hand.

Manufacturers of air bag systems have placed membrane switch horn actuators between hub covers and air bags. Various problems, however, have been encountered in providing membrane switches that activate the horn in response to a force within a desired range. Membrane switches have the tendency to require too little or too much force to close

SUMMARY OF THE INVENTION

A deflection sensing system for detecting deflection includes one or more deflection sensors between opposing sets of extensions. When one set of extensions is moved toward an opposing set of extensions, the deflection sensors are deflected. A preferred deflection sensor is a flexible potentiometer, which has a resistance that changes as the flexible potentiometer is deflected. A flexible potentiometer includes a variable resistance material on a substrate. An example of extensions are ribs.

In a preferred system, the flexible potentiometer includes a cantilevered section, which is deflected about an extension with respect to the remainder of the flexible potentiometer, or with respect to a portion of the substrate not including the variable resistance material. A flexible potentiometer experiences less stress when in cantilevered form than when stretched between two extensions. In either case, the extensions may be joined to first and second corrugated plates or other substrates. The extensions may form a web or grid and act as their own substrate so that another substrate is not required. Further, the extensions may be applied directly to a hub cover or air bag such that the hub cover or air bag act as a substrate.

A particular application for the system is in a horn activator used in connection with an automobile air bag system. A corrugated plate may be adhered to the inside of a hub cover. Alternatively, the extensions may be adhered directly to the hub cover. Analyzing circuitry senses the resistance of a resistive grid including flexible potentiometers. The analyzing circuitry interprets a change in resistance to mean there has been a deflection. In some embodiments, there merely needs to be some change in resistance. In other embodiments, the amount of change in resistance is considered so that, for example, the amount of change must be above a threshold. The analyzing circuitry may essentially simultaneously analyze the resistance of more than one resistive grid or deflection sensor. The invention has applications in a variety of systems including a system for determining whether a can or bottle is present in a can or bottle dispenser.

In a preferred embodiment of the invention, a horn control activation system is used in an automobile having an air bag adjacent to a steering wheel and having a horn. The horn control activation system may include a first and second plurality or sets of extensions. A resistive grid that may include flexible potentiometers or other deflection sensors, each that may include a cantilevered section that extends beyond at least one of the extensions of the first plurality and is selectively deflected by at least one of the extensions of the second plurality, thereby causing a change in resistance of the resistive grid. An activation circuitry may activate a horn when the activation circuitry receives an activation signal. Analyzing circuitry connected to the plurality of flexible potentiometers and to the activation circuitry may supply the activation signal to the activation circuitry in response to the change in resistance of the resistive grid. The analyzing circuitry may respond to changes in more than one resistive grid.

DETAILED DESCRIPTION OF PREFERRED EMBODIMENTS

A. Systems in which flexible potentiometers are stressed between extensions

Figure 4:
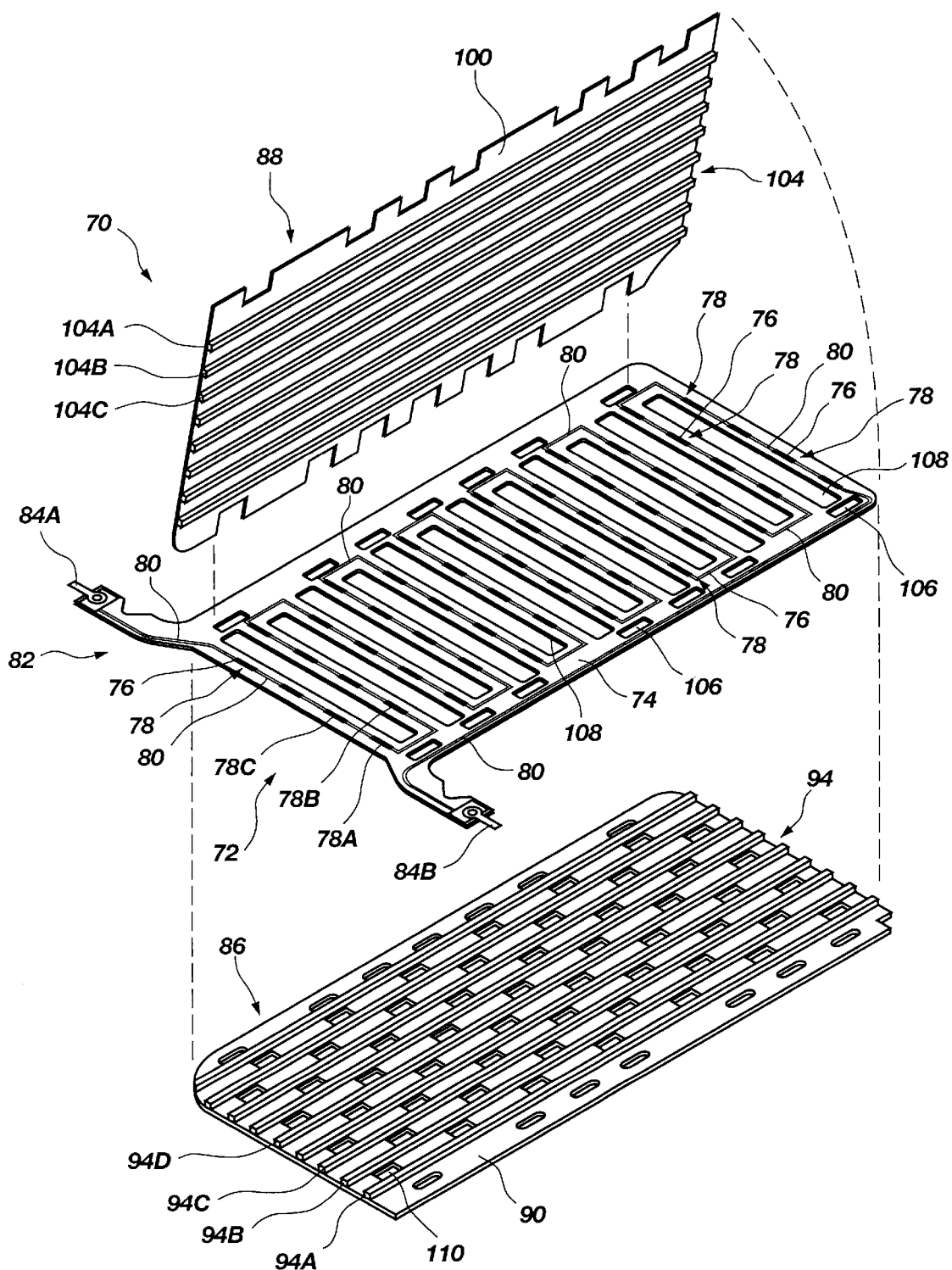
FIG. 4 is an exploded view of a deflection assembly including a resistive grid between two corrugated plates.

One system for detecting an automobile driver pressing against a hub cover includes one or more deflection sensors, such as flexible potentiometers, positioned adjacent to a hub cover between inter-positioned extensions. A flexible potentiometer has a resistance that changes as the flexible potentiometer is deflected. An example of such an arrangement is shown in FIG. 4. Referring to FIG. 4, a deflection assembly 70 includes a resistive grid 72. Resistive grid 72 includes a flexible substrate 74 to which a plurality of segments of variable resistance material 76 are adhered to form a plurality of flexible potentiometers 78. Flexible potentiometers 78 are separated by conductors 80. For clarity in illustration, only some of flexible potentiometers 78, segments of variable resistance material 76, and conductors 80 are identified by reference numbers in FIG. 4 Flexible potentiometers 78A, 78B, and 78C are specifically identified. Conductors 80 and flexible potentiometers 78 form a resistive circuit 82 having terminals 84A and 84B. Flexible potentiometers 78 have a resistance that changes when the flexible potentiometers are deflected. The total resistance $R_T$ between terminals 84A and 84B predictably increases a measurable amount when any of flexible potentiometers 78 are deflected. The various flexible potentiometers may be joined in series (as in FIG. 7) or in parallel.

Deflection assembly 70 includes a first corrugated plate 86 and a second corrugated plate 88. In a preferred embodiment, corrugated plate 88 has an adhesive backing that sticks to the inside of a hub cover (such as hub cover 20). Corrugated plate 86 includes a base 90 on which nine extensions (e.g. ribs) 94 are formed or otherwise affixed. To facilitate the description, four of extensions 94 are specifically identified as extensions 94A, 94B, 94C, and 94D. Corrugated plate 88 includes a base 100 on which eight extensions 104 are formed (such as through molding) or otherwise affixed. To facilitate the description, three of extensions 104 are specifically identified as extensions 104A, 1043, and 104C. A greater or lesser number of extensions 94 and 104 could be used.

Figures 5A, 5B:
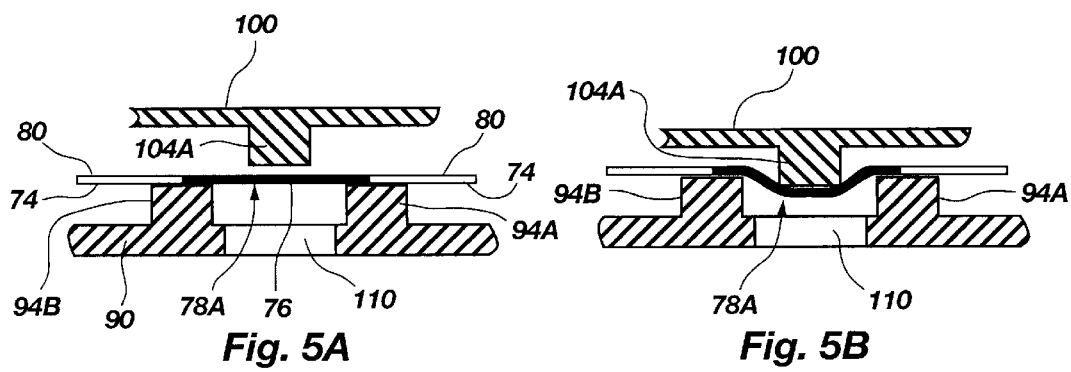
FIG. 5A is a cross-sectional side view of a section of the assembly of FIG. 4 in an inactivated state.
FIG. 5B is a cross-sectional side view of a section of the assembly of FIG. 4 in an activated state.

In a preferred embodiment, substrate 74 and corrugated plates 86 and 88 are aligned so that flexible potentiometers 78 and extensions 104 are positioned between pairs of extensions 94. For example, flexible potentiometer 78A and extension 104A are between extensions 94A and 94B; flexible potentiometer 78B and extension 104B are between extensions 94B and 94C; and flexible potentiometer 78C and extension 104C are between extensions 94C and 94D. Of course, it is somewhat arbitrary whether plate 86 or plate 88 has the greater number of extensions and what is between what. As used herein, the term "between" may include the situation in which one or more of flexible potentiometers 78 or extensions 104 is above (e.g. FIG. 5A.), equal to, or below the highest point of corresponding extensions 94. Extension 104A is adjacent to flexible potentiometer 78A, extension 104B is adjacent to flexible potentiometer 78B, and extension 104C is adjacent to flexible potentiometer 78C. There may be some overlap of flexible potentiometers 78 and extensions 94, as is shown in FIG. 5A, although it may be wasteful. Under some embodiments of the invention, there may be some overlap between opposing extensions.

In a preferred embodiment, corrugated plate 86 is stationary and corrugated plate 88 moves with the hub cover (such as hub cover 20). Substrate 74 and flexible potentiometers 78 are positioned between base 90 and extensions 104. In operation, as the hub cover is pressed, at least some of extensions 104 move toward base 90 deflecting at least some of flexible potentiometers 78. An example of such a deflection is illustrated in FIG. 5B. The number of flexible potentiometers 78 that are deflected may vary depending on various factors including the size of the hand (or other object) that presses against the hub cover, the force with which the hub cover is pressed, and the materials of the hub cover, resistive grid 72, and corrugated plates 86 and 88. The deflection of flexible potentiometers 78 increases the total resistance $R_T$.

Apertures or notches, such as notch 106, may be used in substrate 74, corrugated plate 86, and/or corrugated plate 88 to keep them aligned with respect to themselves and prevent movement with respect to other objects. Other apertures, such as aperture 108, may increase the flexibility of substrate 74. Apertures may also be included between extensions 94. For example, referring to FIGS. 4, 5A, and 5B, an aperture 110 may be positioned between extensions 94A and 94B. In some embodiments of the invention, apertures such as aperture 110 may allow a section of flexible potentiometers to extend below base 90 when deflected.

It is not necessary that there be only a single deflection circuit 82 in resistive assembly 70. Also, it will be apparent that the extensions may take various forms other than that shown in FIG. 4. For example, the extensions could be thicker or thinner, elevated on only one side, circular in cross-section, and/or circular lengthwise to name only a view variations. The extensions of plates 86 and 88 are lengthwise continuous, but they could be discontinuous. In an alternative embodiment, extensions 104 may be formed into or otherwise directly affixed to the hub cover. Extensions 94 may be formed into or otherwise directly affixed to the hub cover or some other object.

B. Potential problems with stressing flexible potentiometers between extensions

Deflecting a flexible potentiometer between two extensions, as in FIG. 5B, may create considerable stress in flexible potentiometers 78. As a flexible potentiometer approaches or exceeds its yield point, the elastic memory of the flexible potentiometer may become degraded and it will become less controllable, predictable, and reliable. Yield points decrease as heat increases. Substrate 74 may be constructed of various materials including various polymers, such as polyamide, polycarbonate, polyimide (Kapton), and polyester (Mylar), which may be thermoplastics. A characteristic of materials such as polyester is that after being deflected, they have a tendency to not deflect back to their original forms when subjected to a level of heat that may occur in an automobile. Other materials such as polyimide (Kapton) have a higher yield point, but are considerably more expensive.

C. Systems with cantilevered flexible potentiometers

Figures 6A, 6B:
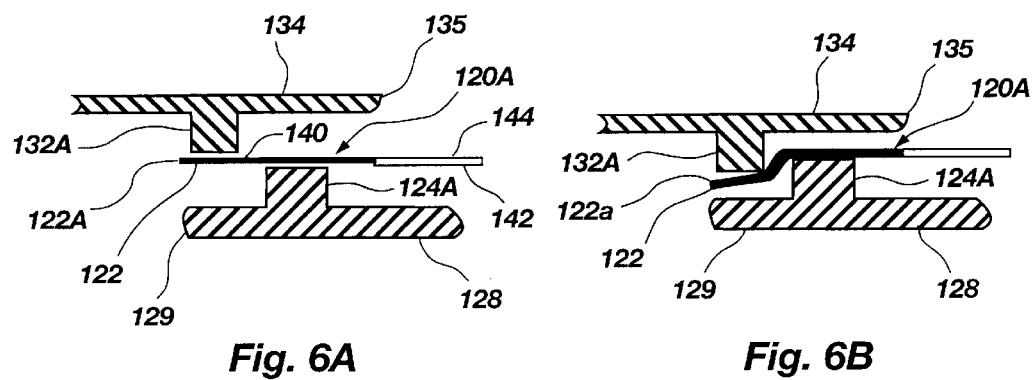
FIG. 6A is a cross-sectional side view of a section of the deflection assembly employing a cantilevered feature in an inactivated state.
FIG. 6B is a cross-sectional side view of a section of the deflection assembly employing a cantilevered feature in an activated state.

A solution to the above-identified problem is to deflect a cantilevered section of a flexible potentiometer (herein called a cantilevered flexible potentiometer). This avoids all or substantially all of the stressing that might occur in the arrangement of FIG. 5B. Referring to FIG. 6A, a cantilevered flexible potentiometer 120A includes a cantilevered section 122 with distal end 122A. The cantilevered section 122 is held in place between an extension 124A of a corrugated plate 128 and an extension 132A of a corrugated plate 134. The corrugated plate 134 has an end or edge 135; and the corrugated plate 128 also has an end or edge 129. Corrugated plates 128 and 134 may be similar to plates 86 and 88, but the extensions may be spaced further apart. Flexible potentiometer 120A includes a variable resistance material 140 on a substrate 142. A conductor 144 is also on substrate 142. It is not necessary that flexible potentiometer 120A extend far so far beyond extension 124A. Indeed, in some embodiments, flexible potentiometers 120 do not overlap extension 124A at all.

Referring to FIG. 6B, when plate 134 moves toward plate 128 (or vice versa), cantilevered section 122 is deflected with respect to the remainder of flexible potentiometer 120A, causing the resistance of flexible potentiometer 120A to increase.

Figure 7:
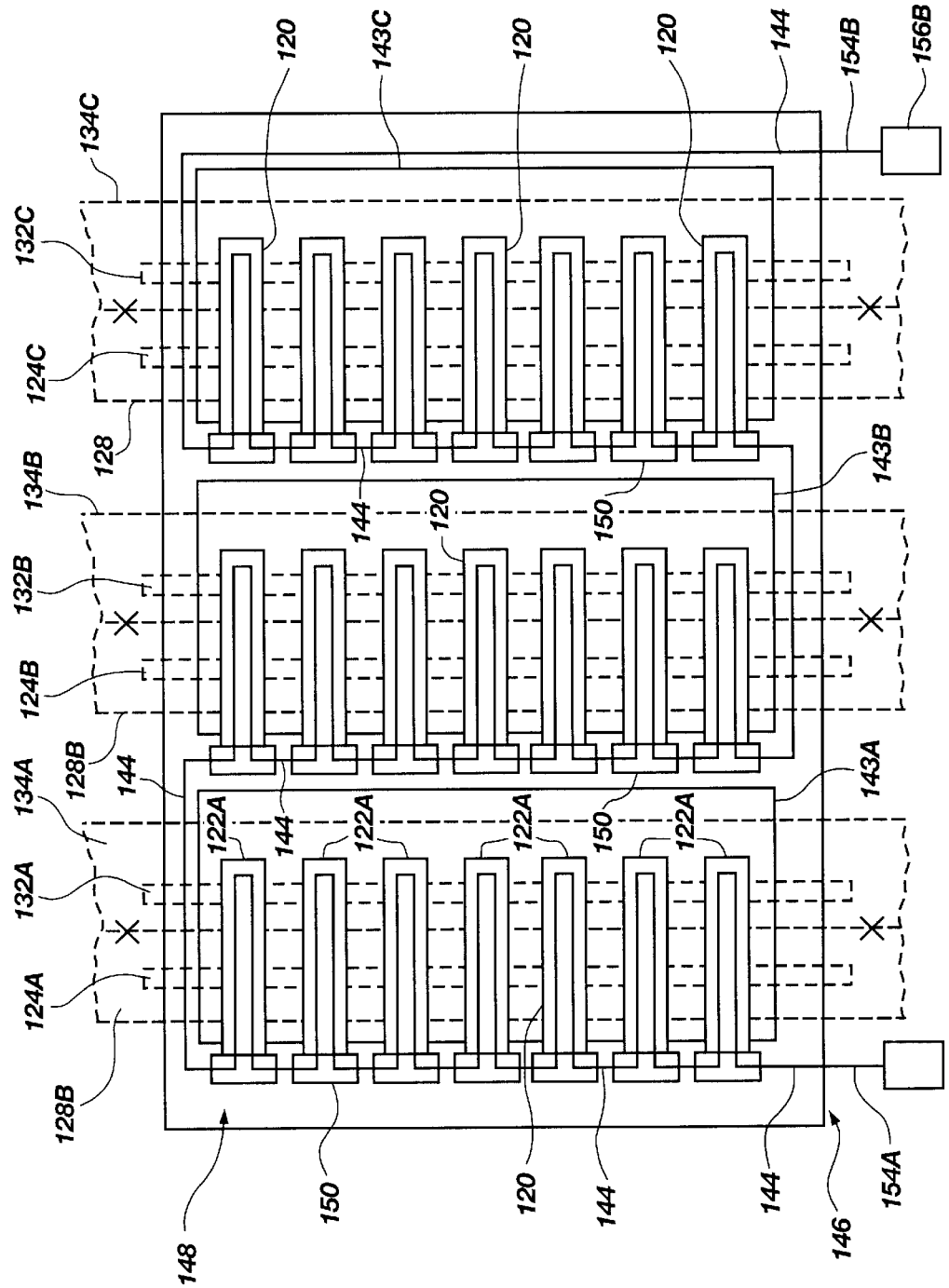
FIG. 7 is a top plan view of a system that includes the flexible potentiometer and plates of FIGS. 6A and 6B.

FIG. 7 is a top plan view of a resistive grid 146 of a deflection assembly 148 that includes plates 128 and 134 (in FIG. 6). Resistive grid 146 includes cantilevered flexible potentiometers 120, shown in FIGS. 6A and 6B. The same reference numerals are used for ease of understanding. Referring to FIG. 7, various flexible potentiometers 120, are formed on substrate 142. Conductive junction points or bonding pads 150 may be connected to flexible potentiometers 120; and conductors 144 are connected to the bonding pads. Dashed lines 132A, 132B, and 134C are the extensions of corrugated plates 134A, 134B and 134C and represent their approximate positions. Dashed lines 124A, 124B and 124C are extensions of corrugated plates 128A, 128B and 128C and represent their approximate positions. The positions are approximate for two reasons: (1) the relative positions of the extensions are somewhat arbitrary, and (2) the dashed lines are placed so as to minimize clutter in FIG. 7. Apertures 142A, 143B and 143C may be included in substrate 142, similar to or different from those apertures 108 in substrate 74 of FIG. 4. To avoid clutter, only some of the flexible potentiometer, bonding pads, and conductors, etc., are identified by reference numerals. Deflecting any of flexible potentiometers 120 causes an increase in the resistive grid 146 between terminals 154A and 154B. Terminals 154A and 154B may be connected to conductive junction points or pads 156A and 156B.

Figure 7A:
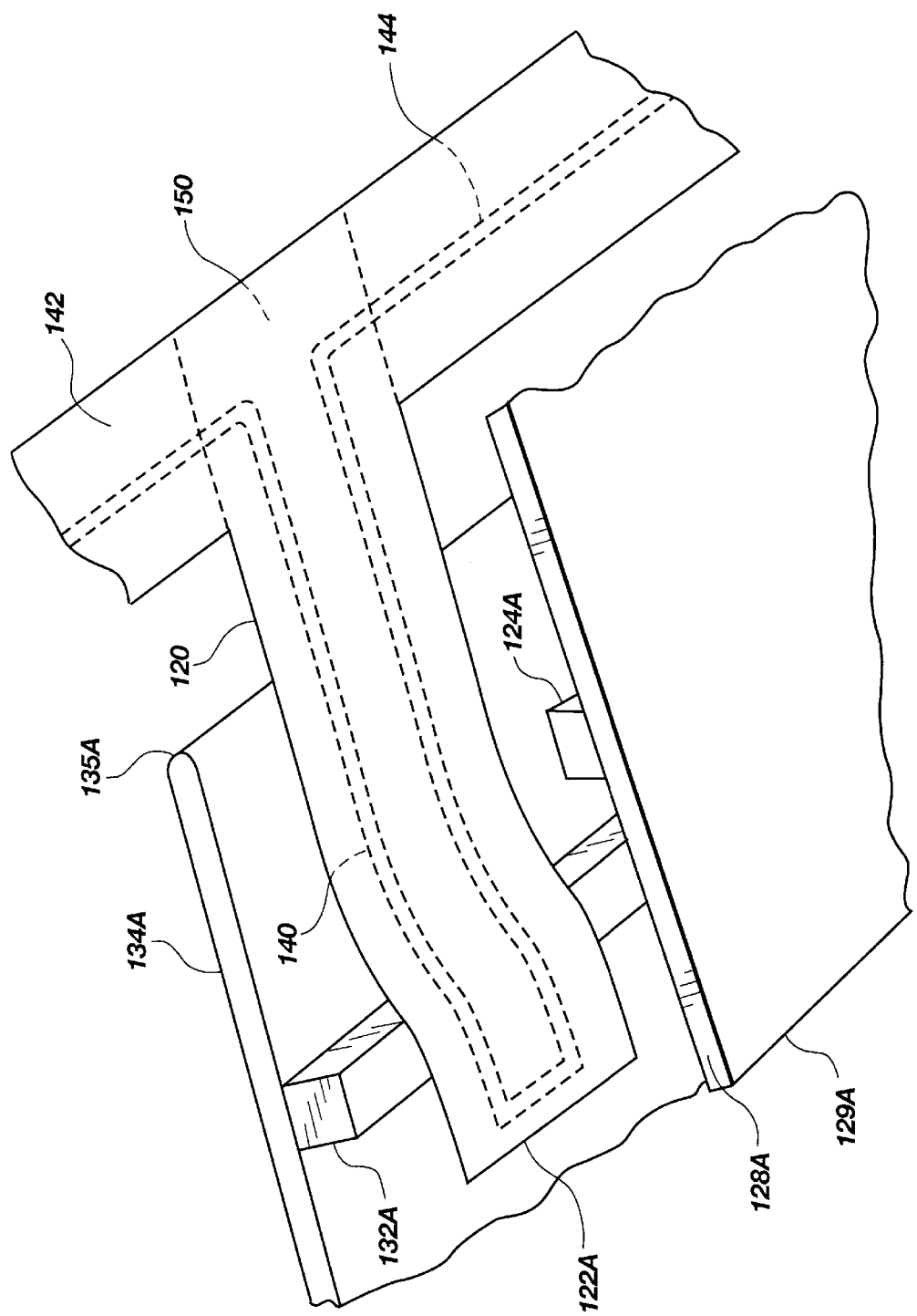
FIG. 7A is perspective view of the assembly of FIGS. 6A and 6B.

FIG. 7A is a perspective of the arrangement of the flexible potentiometer 120 between the corrugated plate 134 and the corrugated plate 128 to illustrate the cantilevering effect as the flexible potentiometer is bent about and by the extensions 124A and 132A upon movement of the corrugated plates 128 and 134 together.

Figure 1:
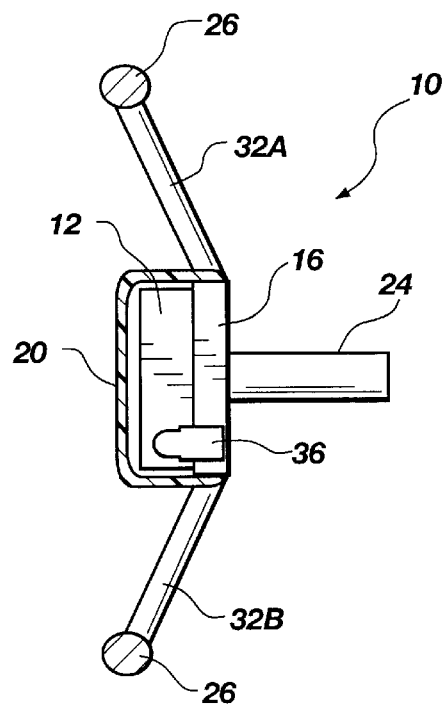
FIG. 1 is a side view of a typical prior art air bag system.
Figure 2:
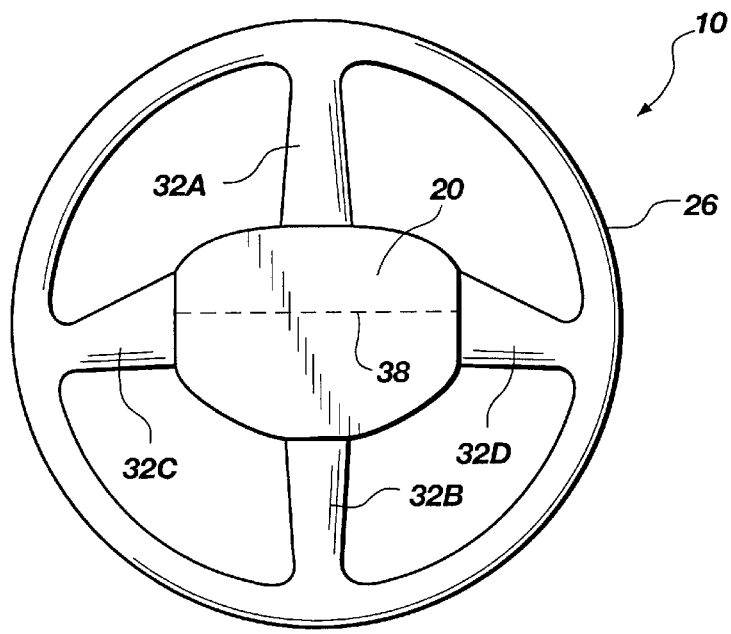
FIG. 2 is a front view of the typical prior art air bag system shown in FIG. 1.
Figure 3:
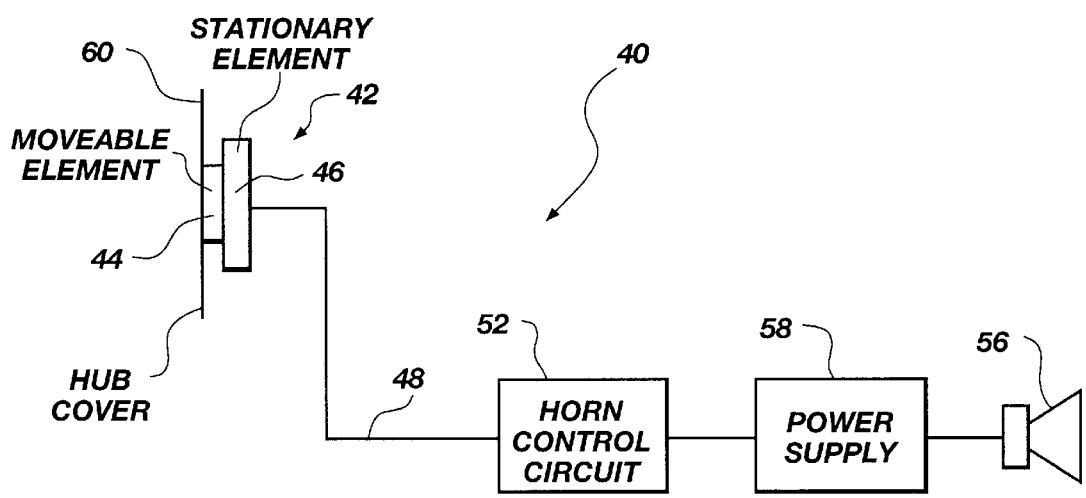
FIG. 3 is a schematic representation of a typical prior art automobile horn control system.
Figure 8:
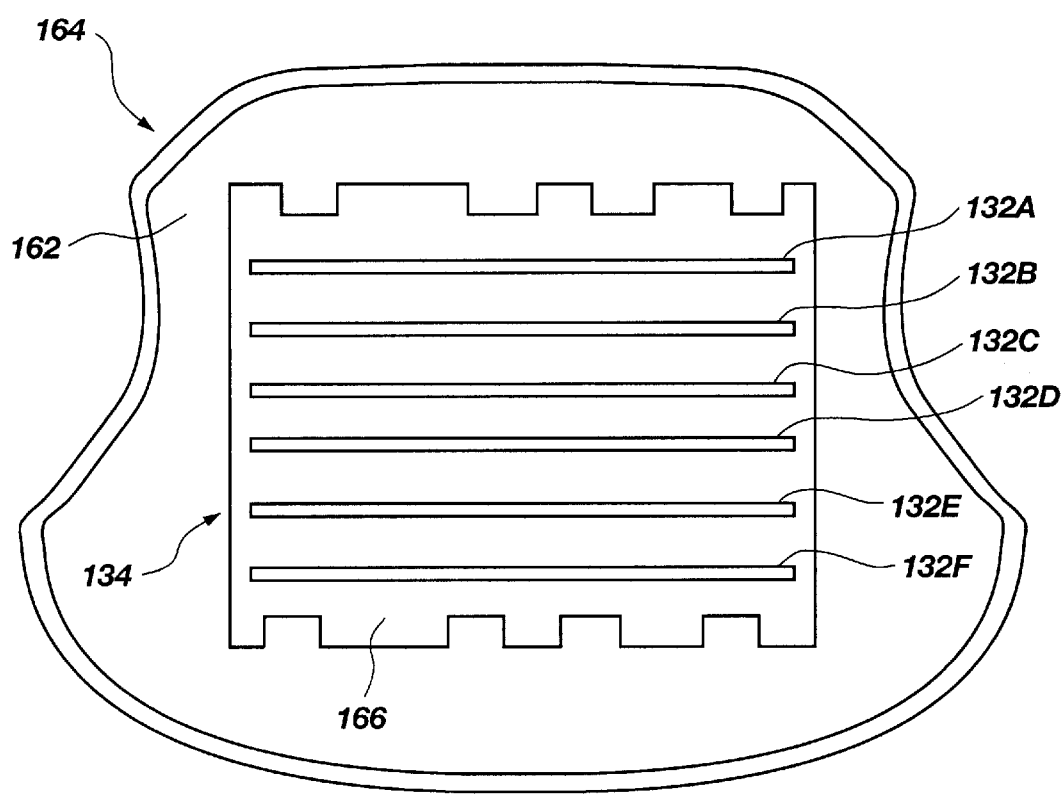
FIG. 8 is a front view of the inside of a hub cover to which a corrugated plate is attached.

FIG. 8 shows a view of an inside surface 162 of a hub cover 164 (similar to hub cover 20 in FIGS. 1 and 2) Corrugated plate 134 is attached to inside surface 162. Corrugated plate 134 is shown with extensions 132A–132F on a base 166. However, it must be emphasized that there could be a greater or lesser number of extensions, and the extensions could be a variety of shapes and sizes, and made of a variety of materials (such as plastic). The extensions can be integrally formed (such as with molding) with base 166 or glued or otherwise affixed to base 166. Alternatively, the extensions may be attached to or formed directly with inside surface 162 of hub cover 164 or some other object. The extensions may be arranged horizontally, vertically, or at one or more angles with respect to hub cover 164. The extensions may have an irregular shape.

D. Applications for deflection assemblies and resistive assemblies

Deflection assemblies (e g. 70 and 148), resistive grids (e.g. 72 and 146), and other variations of the flexible potentiometer have uses in a variety of applications or uses, including in automobiles, and in other systems not part of automobiles. In automobiles, applications include a horn control system, cruise control, radio control, headlight control, to name only a few. For some applications, whether or not in an automobile, the number of flexible potentiometers may be considerably smaller than those illustrated in FIGS. 4 and 7. Indeed, the number could be as small as one. Deflection assemblies, resistive assemblies, and other variations of the flexible potentiometers may be used to measure the weight of a person in an automobile seat as a function of the resistance measured. In a preferred embodiment, a greater weight would lead to a larger resistance. The amount of resistance could control the level at which an air bag is inflated, or the timing of the inflation with respect to a triggering event.

Figure 9A:
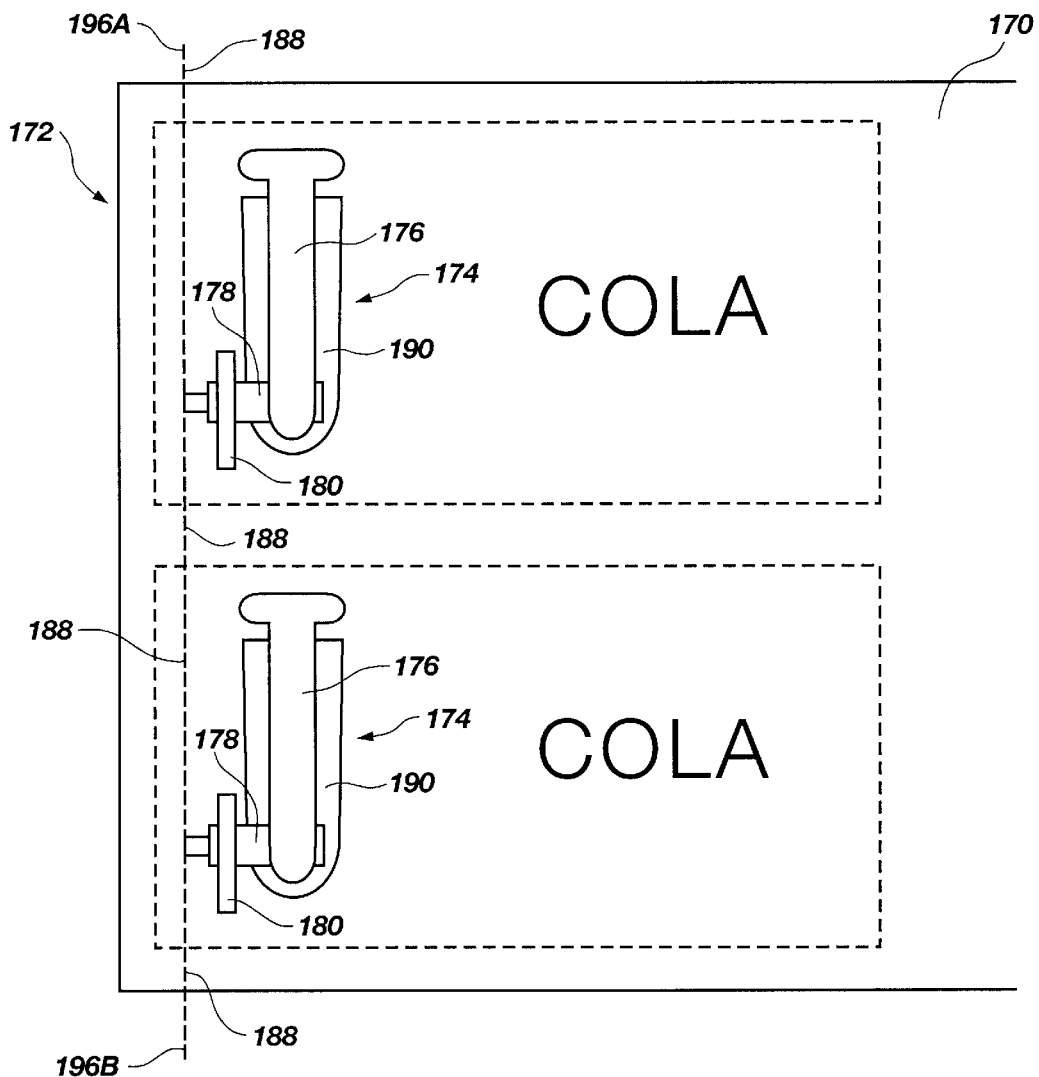
FIG. 9A is a top plan view of a support of a can dispenser that includes deflection sensing assemblies having cantilevers.
Figure 9B:
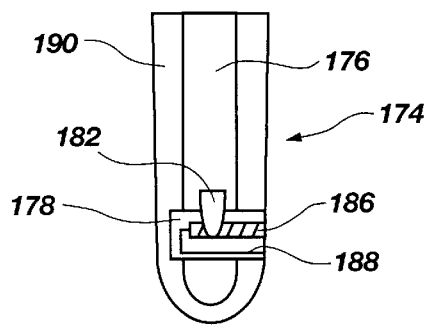
FIG. 9B is a bottom plan view of one of the deflection sensing assemblies of FIG. 9A.

One of the many applications for systems not ordinarily included in automobiles is for a dispenser for cans, bottles, or other items. The dispenser could include a cantilevered flexible potentiometer (or other deflection sensor) corresponding to each item (or at least certain items). Referring to FIGS. 9A and 9B, a support 170 in a dispenser assembly 172 supports "Cola" cans shown in dashed lines, although various cans, bottles, or other items could be supported. As an example, the system of FIGS. 9A and 9B could be used to keep track of bottles or cans removed from a hotel room vending machine. FIG. 9B is a bottom plan view for one of dispenser assemblies 172 for FIG. 9A. Deflection sensing assemblies 174 include cantilevers 176 connected to support 170. Cantilevered substrates 178 are also connected to support 170 and may be held in place by a clip or other member 180. (Cantilevers 176 may be consider extensions with respect to cantilevered substrates 178.) Referring to FIG. 9B, cantilevered substrates 178 may be secured to cantilevers 176 through a member clip or other member 182. Cantilevered substrate 178 supports a variable resistance material to form a flexible potentiometer 186 shown in hatched lines (or other deflection sensor). Conductors 188 connects flexible potentiometer 186 to remote monitoring circuitry. The flexible potentiometer may be connected in series (as in FIG. 9A) or in parallel. In FIG. 9A, conductors 188 are shown in dashed lines in that they are preferably covered. Apertures 190 may be formed from support 170 to allow movement of cantilevers 176 and cantilevered flexible potentiometer 186.

When present, a "Cola" can presses against an adjacent cantilever 176 causing flexible potentiometer 186 to be deflected. When the "Cola" can is removed, flexible potentiometer 186 assumes a non-deflected or less deflected position, thereby reducing the total resistance of the resistive assembly between terminals 196A and 196B. A reduction in resistance indicates that an item has been removed. An increase in resistance indicates an item has been added. The resistive assembly may be used in connection with circuitry that monitors the number of cans or bottles in a dispenser so as to indicate to management when the dispenser needs to be replenished.

Deflection assemblies, resistive assemblies, and other variations of the flexible potentiometers may be used to detect proper or improper balance.

The invention is not restricted to use of only one resistive assembly per application or uses. Multiple resistive assemblies could be joined in an "AND", "OR", or other logical arrangement.

E. Additional circuitry

Figure 10:
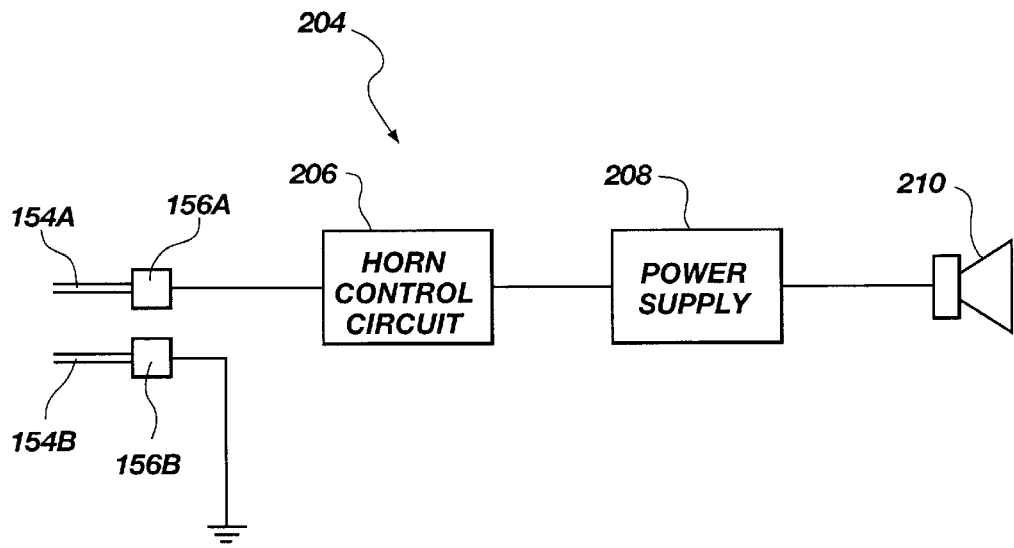
FIG. 10 is a schematic representation of an automobile horn control system that is responsive to a resistive grid of the present invention.

Referring to FIG. 10, an automobile horn control system 204 includes horn control circuit 206, power supply 208, and a horn 210. Power supply 208 and horn 210 may be standard, well known automobile parts. Control circuit 206 produces an activation signal to power supply 208, which in turn activates horn 210. The following discussion proceeds with respect to deflection assembly 148 of FIGS. 6A, 6B, and 7, but could apply to deflection assembly 148 of FIG. 7, or deflection assembly 70 of FIG. 4. When combined, deflection assembly 70 and horn control system 204 are an example of a horn control activation system.

The function of horn control circuit 206 is to activate power supply 208 when the driver presses against particular portions of the hub cover with at least a threshold level of force. A preferred horn control circuit 206 has the following characteristics. The resistance of resistive grid 146 may change with changes in temperature. Therefore, a preferred horn control circuit 206 responds to extremely rapid changes in the resistance of the resistive grid 146, but not to more gradual changes. As used herein, rapid changes are those roughly on the order of the time required to honk a horn. The resistance of resistive grid 146 depends on the shape and characteristics of various parameters including the hub cover, the air bag, flexible substrate 142, and variable resistance material 140. The shape and characteristics of these parameters vary significantly from one model of car to another. Also, because of tolerances in manufacturing, the shape and characteristics of these parameters vary even with the same design. Because horn control circuit 206 responds to changes in resistance rather than to the absolute resistance of resistive grid 146, at least relatively small (and perhaps large) variations in the shape and characteristics of these parameters will not affect whether horn control circuit 206 properly responds to the driver pressing against the hub cover to sound horn 210. This feature is referred to as a zeroing out function.

Those skilled in the art will appreciate that a variety of circuits may be employed to carry out the above-described functions of horn control circuit 206. Horn control circuit 206 may include a microprocessor that is software controlled, which provides significant flexibility and ease in accommodating a wide variety of parameters. Dedicated hardware could also be used. Terminal 154B does not have to be connected to a ground potential. Well known buffering circuitry and power supply circuitry is not shown to avoid clutter in the figures.

Figure 11:
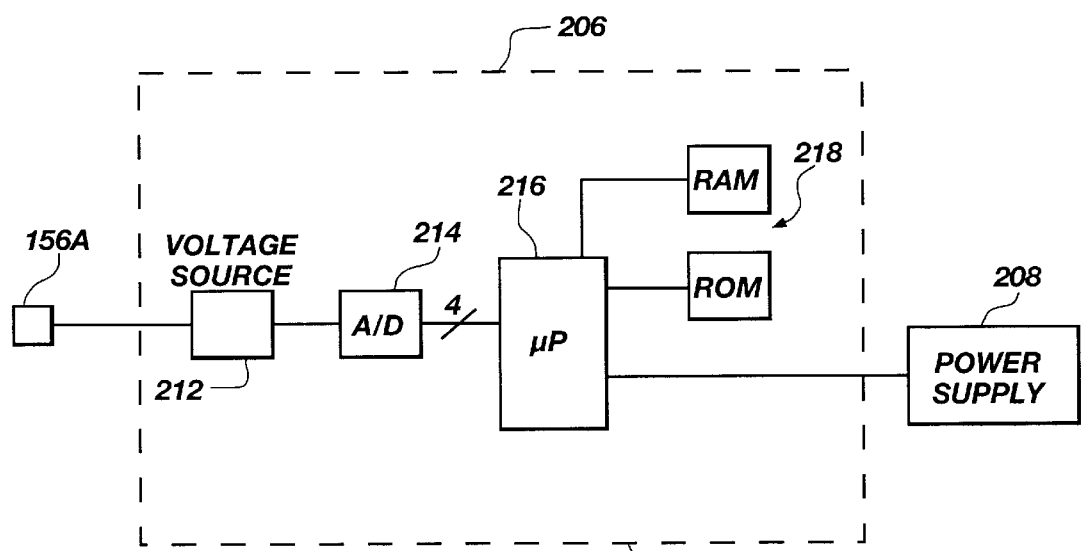
FIG. 11 is a schematic representation of a horn control circuit that employs a microprocessor.

Referring to FIG. 11, in one embodiment, horn control circuit 206 includes voltage source 212 that provides a voltage that represents the resistance value in resistive grid 146. Voltage source 212 may employ a voltage divider. An analog-to-digital converter (A-to-D) 214 converts the analog signal provided by voltage source 212 to a digital signal that is read by a microprocessor 216 (or dedicated hardware or other circuitry). A-to-D 214 may have a four bit output, or some other number of bits. Microprocessor 216, which may employ read only memory (ROM) and random access memory (RAM) 218 (which may be on board), preferably responds to rapid changes in resistance rather than to absolute resistance values and has a zeroing out function.

Moreover, microprocessor 216 may respond differently depending on the magnitude of the change. For example, microprocessor 216 could cause a power supply to send voltage levels to a horn that are related to the magnitude of the change, above a threshold level. Microprocessor 216 may be used for various functions unrelated to the present invention.

Disadvantages of a microprocessor include expense. However, certain microprocessors are relatively inexpensive, as is dedicated hardware. Further, microprocessor 216 may be used for various functions unrelated to the present invention. Indeed, microprocessors are common in automobiles. The functions of horn control circuit 206 may be performed by a variety of analog circuits, that will be apparent to those skilled in the art.

It is important that dislodged objects do not hit the driver in the face as the hub cover splits as the air bag is inflated. Accordingly, portions of the resistive assembly that may break and harm a driver are preferably kept near the edges of the hub cover where they are less likely to strike the driver.

Figure 12:
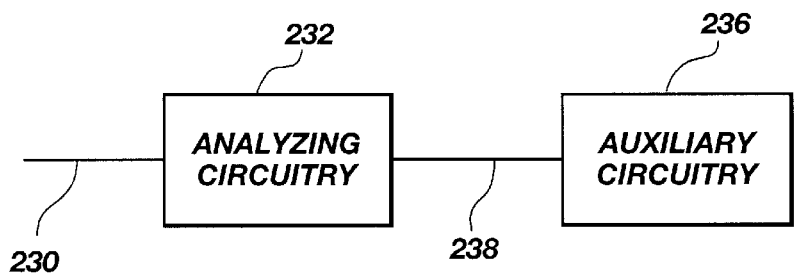
FIG. 12 is a block diagram representation of analyzing circuitry that controls auxiliary circuitry based on the resistance of a resistive grid.

Referring to FIG. 12, a more generalized control circuit is shown that may be used in connection with the resistive grids of FIGS. 4, 7, and 8, for various applications. Conductor(s) 230 connect a resistive grid to analyzing circuitry 232 (which may include a microprocessor, dedicated hardware and/or other circuitry), which assumes various conditions depending on the resistance of the resistive grid. Horn control circuit 206 is an example of analyzing circuitry 232. Auxiliary circuitry 236 receives a signal(s) on a conductor(s) 238 from analyzing circuitry 232 that controls auxiliary circuitry 236. Merely as an example, in the case of FIG. 9A, conductor 230 could be connected to terminal 196B; analyzing circuitry 230 could determine how many cans of a particular type (e. Cola or Root Beer) were remaining; and auxiliary circuitry 236 could signal when a particular type of can should be replenished. Auxiliary circuitry 236 may be a headlight power supply, radio power supply, cruise control circuitry, etc.

Figure 13:
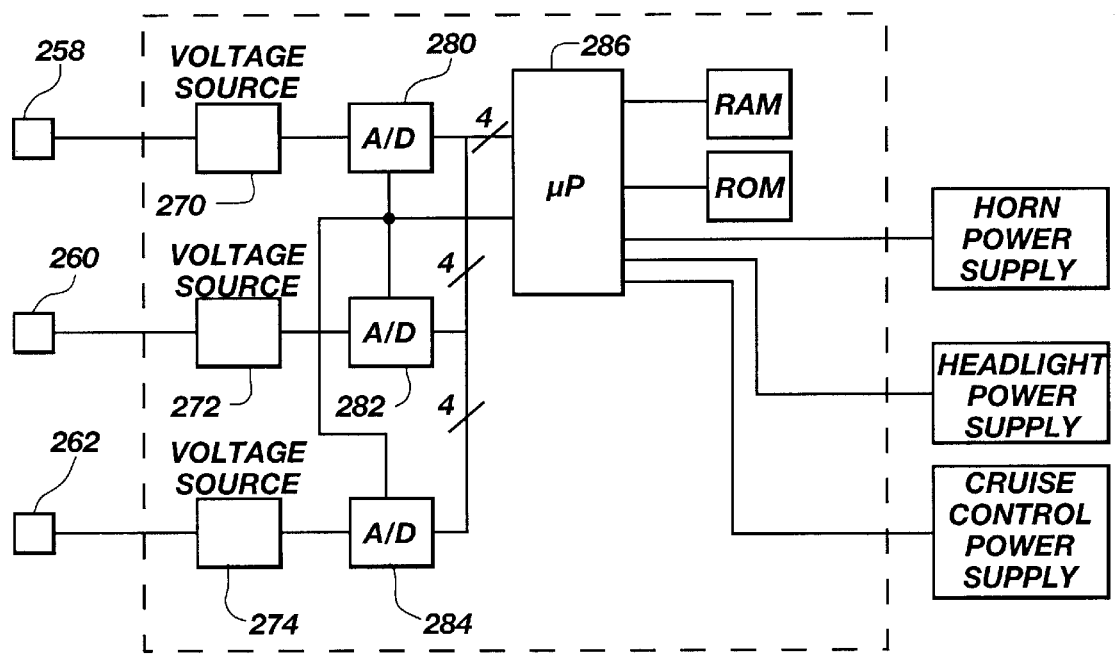
FIG. 13 is a schematic representation of a control circuit that controls multiple functions in the automobile.

Various flexible potentiometers or resistive grids (comprised of more than one flexible potentiometer) or other deflection sensors may be analyzed in parallel. For example, referring to FIG. 13, multiple flexible potentiometers may be used to control multiple devices in an automobile. For example, a deflection sensor (such as a resistive grid or a flexible potentiometer), connected to conductive junction point 258 is used as a horn actuator. A deflection sensor connected to conductive junction point 260 is used to control headlights. A deflection sensor connected to conductive junction point 262 is used to control cruise control. In this example, voltage sources 270, 272, and 274 convert the amount of resistance in flexible potentiometers to analog voltages which are, in turn, converted to digital voltages by A-to-D converters 280, 282, and 284. The digital voltages from A-to-D converters 280, 282, and 284 may have, for example, four bits, which are read by microprocessor 286, which may be more powerful than microprocessor 216 in FIG. 11. Microprocessor 286 may respond differently to different voltage changes. For example, one voltage change may indicate a low beam headlights condition, while a second voltage change may indicate a high beam head light condition. In the case of the horn, different voltage changes would indicate different desired horn loudness. A flexible potentiometer may act as a switch and magnitude combination in which a threshold force turns a function on, but increased force increases the magnitude.

Flexible potentiometers may be used as actuators for a horn control system in an automobile without an air bag. In an automobile with an air bag, a flexible potentiometer used as an actuator for a horn control system does not need to be placed adjacent to the air bag.

F. Details regarding the variable resistance material

A variable resistance material (e.g. variable resistance material 76 in FIG. 4 or variable resistance material 140 in FIG. 6A) is applied to a substrate to create a flexible potentiometer. Flexible potentiometers are marketed under the mark Bend Sensor™ by Flexpoint, Inc., 656 West 7250 South, Midvale, Utah, 84047, which is associated with inventor Gordon B. Langford. Deflection sensors, other than flexible potentiometers, may have another electrical parameter that is altered through deflection. The variable resistance material may be formed of an electrically conductive ink which predictably changes electrical resistance upon deflection or bending between a first configuration and a second configuration. Various types of phenolic resin materials are presently believed to be suitable for the variable resistance material. For example, a phenolic resin Formula 3609 that has been manufactured by Electronic Materials Corporation of America (EMCA-REMEX Products, Ablestik Electronic Materials & Adhesives), 160 Commerce Drive, Montgomeryville, Pa., 18936, has been found suitable in that it is elastically flexible or bendable for many thousands of cycles or bends.

The variable resistive material may be a two-part epoxy material, a thermoset adhesive, or a thermoplastic, all incorporating conductive material such as graphite or carbon. The variable resistance material may include a carbon ruthenium.

Merely examples, the substrate may be from about 0.005 to about 0.010 inches in thickness (although various other thicknesses may be acceptable); the variable resistive material may be from about 0.0003 to about 0.001 inches in thickness (although various other thicknesses may be acceptable).

To attach to a substrate, the variable resistance material may include a material which facilitates wetting, gluing, or sticking. The variable resistance material may include graphite in combination with a binder. The variable resistance material is preferably of the type which is applied to the substrate in liquid form and which in turn dries to a solid form.

A resistive grid or flexible potentiometer may be used to measure a degree or angle of deflection. The more the deflection, the less the resistance. With measurements, a relationship between the degree or angle of deflection and the resistance can be developed and used in software, that would be relatively simple to create.

Segmented constant resistance conductive material may be used in combination with a flexible potentiometer to reduce the resistance. The segmented conductors may be made of silver, silver alloys, or other conductive metals, as well as conductive carbon-based compounds. The segmented conductors may be applied in a liquid form, or applied in a solid form which is pressed onto the variable resistance material. The conductivity of the segmented conductors remains essentially constant upon deflection. Therefore, the segmented conductors provide paths for electrical current that are in parallel with the path provided by the variable resistance material. The segmented conductors act as attenuators. It is believed that the segmented conductors may help to make the resistance versus load curve of a flexible potentiometer more linear. The segmented conductors may help make the resistance at a particular deflection configuration more consistently repetitive.

The variable resistance material may be spray painted, rolled, silk screened, or otherwise printed onto the substrate (which may be the inside of the hub cover). The variable resistance material may be a solid which is pressed onto the substrate. In the case where the hub cover is the substrate, another substrate, such as a polyester substrate, is unnecessary. Such an arrangement could be used without extensions or cantilevers, relying on deflections of the hub cover to produce defections in the variable resistance material of the flexible potentiometer.

It is believed but not known that as a flexible potentiometer (of some or all compositions), is deflected or bent, the variable resistance material cracks or deforms. That is, in some or all compositions, dried variable resistance material has a granular or crystalline-type structure which cracks or breaks upon deflection. As the variable resistance material deflects, the number of cracks and the space between them is believed to increase, thereby changing the electrical resistance in a predictable manner. The change can be measured upon application of suitable electrical signals.

A conductive substrate may be used. The substrate may be connected to a particular potential, such as ground. Alternatively, a non-conductive coating may be applied to the substrate.

Although the results of the present invention (e.g. cantilevered substrate) may be more dramatic with a substrate having a lower yield point, the invention may be used with a variety of substrates including a polyimide (Kapton) substrate.

Figure 14:
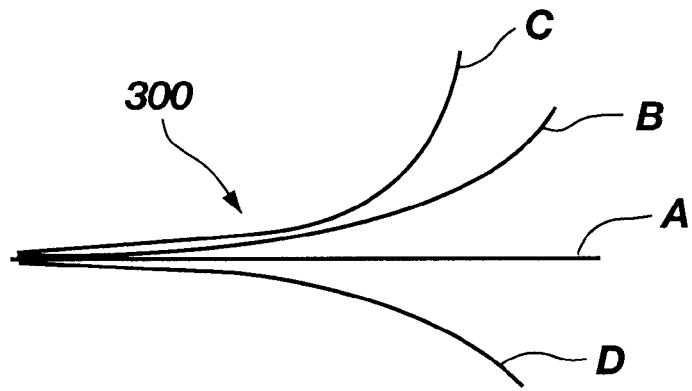
FIG. 14 is a side view of a flexible potentiometer in various degrees of deflection.

Certain flexible potentiometers have a substantial change in resistance only when deflected in a first direction from a straight position, not when deflected in an opposite direction from a straight position. For example, FIG. 14 shows a side view of a flexible potentiometer 300 at various degrees of deflection, denoted A, B, C, and D. Flexible potentiometer 300 is a flexible potentiometer having a substrate on which a layer of variable resistance material is applied. At deflection degree A, which is straight, flexible potentiometer 300 has a resistance $R_A$. At deflection degree B, flexible potentiometer 300 has a resistance $R_B$, which is substantially greater than resistance $R_A$. At deflection degree B, the level of resistance $R_B$ is predictable and repeatable. At deflection degree C, flexible potentiometer 300 has a resistance $R_C$, which is substantially greater than resistance $R_B$ and is predictable and repeatable. Accordingly, as the deflection changes from degree C to degree B, there is a predictable and repeatable decrease in resistance. However, at deflection degree D, in flexible potentiometer 300, there may be only a small change in resistance from resistance $R_A$.

Figure 15:
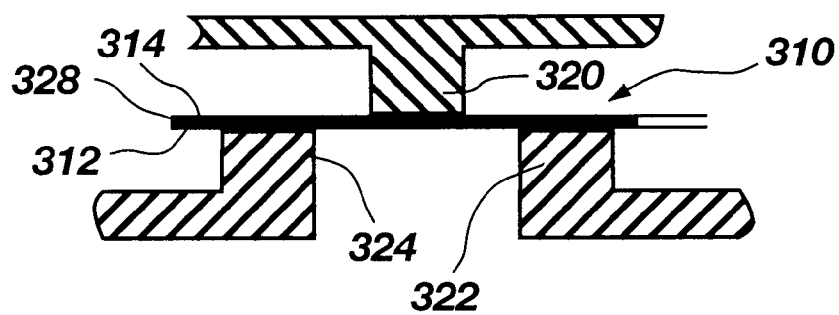
FIG. 15 is a side view of a system for deflecting a flexible potentiometer in two directions from a straight position.

Other flexible potentiometers change resistance in either direction from a straight position. There are various ways of constructing a deflection sensor that senses deflection in two directions from the straight position. Under a first construction, a first layer of variable resistance material is applied to one side of a substrate and a second layer of variable resistance material is applied to the other side of the substrate The first layer is connected between a first set of conductors, and the second layer is connected to a second set of conductors. When the substrate (along with the variable resistance material) is deflected in a first direction, the resistance between the first set of conductors increases by a repeatable and predictable amount, and when the substrate is deflected in a second direction, the resistance between the second set of conductors decreases by a repeatable and predictable amount. FIG. 15 shows one example of such a system. Referring to FIG. 15, a flexible potentiometer 310 includes variable resistance materials 312 and 314 applied to different sides of a substrate. Under one arrangement, to deflect flexible potentiometer 310 in a first direction, an extension 320 moves toward extensions 322 and 324 while extensions 322 and 324 remain stationary. To deflect flexible potentiometer 310 in a second direction, extension 324 moves toward extension 320 while extensions 320 and 322 remain stationary. Flexible potentiometer 310 may terminate at an end 328 to form a cantilevered arrangement.

Under a second construction, a layer of antimony tin oxide is applied over a substrate (e.g. a Kapton substrate), and a layer of variable conductive material is applied to the layer of antimony tin oxide. An extra layer of carbon may be applied over the layer of variable conductive material. When the substrate is deflected in a first direction from the straight position, the resistance of the variable resistance material increases by a predictable and repeatable amount. When the substrate is deflected in a second direction from the straight position, the resistance of the variable resistance material decreases by a predictable and repeatable amount. The arrangement in FIG. 15 may be used in connection with this second construction.

Under another technique, a layer of variable resistance material is applied to a single side of a substrate. The substrate is deflected to an initial setting so that the variable resistance material has an initial resistance value greater than that of the straight position. As the deflection of the substrate is increased from the initial setting, the resistance increases. As the deflection of the substrate is decreased from the initial setting, the resistance decreases. One end of the flexible potentiometer may be weighted and the deflection may be about a pivot point.

As used in the claims, the term "connect," "connectable," or "connected to" are not necessarily limited to a direct connection.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A horn activation system for use in a vehicle having a steering wheel, a horn, and an inflatable air bag associated with the steering wheel, the horn activation system comprising:

a first substrate having a surface with a plurality of first extensions formed to extend away therefrom, each of said first extensions having a first contact surface spaced away from the surface of said first substrate to form a first space adjacent to each of said first extensions;

a second substrate having a surface with a plurality of second extensions formed therewith to extend away therefrom, each of said second extensions having a second contact surface spaced away from the surface of said second substrate and at least one of said second contact surfaces being positioned to register with and enter said first space associated with one of said first extensions upon movement of said second substrate toward said first substrate;

a steering wheel having a steering wheel hub cover and an air bag attached proximate said steering wheel hub cover, said steering wheel hub cover being deflectable by a user between an at-rest position and an active position with one of said first substrate and said second substrate being affixed to said steering wheel hub cover to be deflectable therewith to move relative to the other of said first substrate and said second substrate;

a third substrate which includes a resistive grid for positioning between said first substrate and said second substrate, said resistive grid being comprised of a plurality of flexible potentiometers electrically connected together, each flexible potentiometer of said plurality of flexible potentiometers with one fixed end formed with said third substrate and one free end extending away therefrom and each flexible potentiometer of said plurality of flexible potentiometers having a first portion between said fixed end and said free end to register with said first contact surface of one of said first extensions and a second portion between said first portion and said free end which second portion is cantilevered to extend away from said first portion to register with said first space proximate said first extension for deflection toward and away from said first space to vary the resistance of said flexible potentiometer upon movement of said steering wheel hub cover between said at-rest position and said active position, each of said flexible potentiometers being of the type having an electrical resistance that predictably changes upon deflection thereof;

activation circuitry conductively connected to said horn to activate the horn when the activation circuitry receives an activation signal; and analyzing circuitry conductively connected to said resistive grid and to the activation circuitry, said analyzing circuitry generating and supplying the activation signal to the activation circuitry in response to the change in resistance of the resistive grid upon movement between the said at-rest position and the said active position.

2. The system of claim 1, wherein said plurality of first extensions with said first substrate are formed with a corrugated plate which is adhered to said steering wheel hub cover.

3. The system of claim 1, further comprising an additional resistive grid that is connected to aid analyzing circuitry, and wherein said analyzing circuitry produces said activation signal in response to the change in resistance of the additional resistive grid.

4. The system of claim 1, wherein the said resistive grid is deflectable in two directions.

5. The system of claim 1, wherein a flexible potentiometer is deflectable in two directions, and wherein said potentiometer experiences a change of resistance in response to deflection in different directions from an at-rest position.

6. A horn control activation system for use in a vehicle having an air bag attached to a steering wheel and having a horn, the horn control system comprising:

a first substrate having a surface with a plurality of first extensions formed therewith to extend away therefrom, each of said first extensions having a first contact surface spaced away from the surface of said first substrate to form a first space adjacent to each of said first extensions;

a second substrate having a surface with a plurality of second extensions having a second contact surface spaced away from the surface of said second substrate and at least one of said second contact surfaces being positioned to register with said first space associated with one of said first extensions upon movement of said first substrate toward said second substrate;

a steering wheel of a vehicle having a steering wheel hub cover and an air bag attached proximate said steering wheel hub cover, said steering wheel hub cover being deflectable by a user between an at-rest position and an active position with one of said first substrate and said second substrate being affixed to said steering wheel hub cover to be deflectable therewith to move relative to the other of said first substrate and said second substrate;

a third substrate positioned between a first extension of said first substrate and a second extension of said second substrate;

a plurality of deflection sensors formed on a third substrate, each of said plurality of deflection sensors being of the type which change electrical resistance upon deflection thereof, each of said deflection sensors including a cantilevered section positioned to extend into a said first space proximate one of said first extensions, said cantilevered section having a first end which is non movable relative to one of said first extension and said second extension and one free end extending away from said first end, said free end of each said deflection sensor of said plurality of deflection sensors being deflectable by a said second extension sufficient to cause a change in resistance of said deflection sensor upon movement of said steering wheel hub cover from said at-rest position toward said active position;

activation circuitry conductively connected to said horn to activate said horn when said activation circuitry receives said activation signal; and analyzing circuitry conductively connected to said plurality of deflection sensors and to the activation circuitry, said analyzing circuitry being operative to generate and supply said activation signal, to the activation circuitry in response to the change in resistance of said plurality of deflection sensors.

7. A horn control activation system for use in an automobile having an air bag adjacent to a steering wheel and having a horn, the horn control system comprising:

a first substrate having a surface with a plurality of first extensions formed therewith to extend away therefrom, each of said first extensions having a first contact surface spaced away from the surface of said first substrate to form a first space adjacent to each of said first extensions;

a second substrate having a surface with a plurality of second extensions formed therewith to extend away therefrom, each of said second extensions having a second contact surface spaced away from the surface of said second substrate and at least one of said second contact surfaces being positioned to register with said first space associated with one of said first extensions upon movement of said first substrate toward said second substrate;

a steering wheel of a vehicle having a steering wheel hub cover and an air bag attached proximate said steering wheel hub cover, said steering wheel hub cover being deflectable by a user between an at-rest position and an active position with one of said first substrate and said second substrate being affixed to said steering wheel hub cover to be deflectable therewith to move relative to the other of said first substrate and said second substrate;

a third substrate which includes a resistive grid having a plurality of deflection sensors on said third substrate, each deflection sensor having a first end which is non movable relative to one of said first extension and said second extension and a cantilevered section with a fee end extending away from said first end, said free end respectively being registerable with said first space of an extension of said first substrate, each of said cantilevered sections of said plurality of deflection sensors being deflected by at least one of the said second extensions to cause a change in resistance of the resistive grid upon movement of said first substrate relative to said second substrate;

activation circuitry conductively connected to said horn to activate the horn when the activation circuitry receives an activation signal; and analyzing circuitry conductively connected to said plurality of deflection sensors and to the activation circuitry, the analyzing circuitry generating and supplying the activation signal to the activation circuitry in response to the change in resistance of the resistive grid.

8. A horn activation system for use in a vehicle having a steering wheel, a horn, and an inflatable air bag attached to the steering wheel, the horn activation system comprising:

a first substrate having a surface with a plurality of first extensions formed to extend away therefrom, each of said first extensions having a first contact surface spaced away from the surface of said first substrate to form a first space adjacent to each of said first extensions;

a second substrate having a surface with a plurality of second extensions formed therewith to extend away therefrom, each of said second extensions having a second contact surface spaced away from the surface of said second substrate and at least one of said second contact surfaces being positioned to register with and enter said first space associated with one of said first extensions upon movement of said second substrate toward said first substrate;

a steering wheel having a steering wheel hub cover and an air bag attached proximate said steering wheel hub cover, said steering wheel hub cover being deflectable by a user between an at-rest position and an active position with one of said first substrate and said second substrate being affixed to said steering wheel hub cover to be deflectable therewith to move relative to the other of said first substrate and said second substrate;

a third substrate which includes a resistive grid for positioning between said first substrate and said second substrate, said resistive grid having a plurality of flexible potentiometers electrically connected together, each flexible potentiometer of said plurality of flexible potentiometers having a first portion with a first end which is non movable relative to one of said first extensions and positioned to register with said first contact surface of one of said first extensions, and each of said plurality of flexible potentiometers having a second portion with a free end, said second portion of each of said flexible potentiometers being cantilevered with its free end extending away from said first end into a respective said first space proximate said first extension for deflection by a said second extension toward and away from said first space for varying the resistance of each of said plurality of flexible potentiometers upon movement of said steering wheel hub cover between said at-rest position and said active position;

activation circuitry conductively connected to said horn to activate the horn when the activation circuitry receives an activation signal; and analyzing circuitry conductively connected to said resistive grid and to the activation circuitry, said analyzing circuitry generating and supplying the activation signal to the activation circuitry in response to the change in resistance of the resistive grid upon movement of said steering wheel hub cover between the said at-rest position and the said active position.

9. A horn activation system for use in a vehicle having a steering wheel, a horn, and an, inflatable air bag associated with the steering wheel, the horn activation system comprising:

a first substrate having a surface with a plurality of first extensions formed to extend away therefrom, each of said first extensions having a first contact surface spaced away from the surface of said first substrate to form a first space adjacent to each of said first extensions;

a second substrate having a surface with a plurality of second extensions formed therewith to extend away therefrom, each of said second extensions having a second contact surface spaced away from the surface of said second substrate and at least one of said second contact surfaces being positioned to register with and enter said first space associated with one of said first extensions upon movement of said second substrate toward said first substrate;

a steering wheel having a steering wheel hub cover with an air bag attached proximate said steering wheel hub cover, said steering wheel hub cover being deflectable by a user between an at-rest position and an active position with one of said first substrate and said second substrate being affixed to said steering wheel hub cover to be deflectable therewith to move relative to the other of said first substrate and said second substrate;

a third substrate positioned between a first extension of said first substrate and second extension of said second substrate;

a plurality of flexible potentiometers each formed on said third substrate for positioning between said first substrate and said second substrate, said plurality of flexible potentiometers being electrically connected together, each flexible potentiometer of said plurality of flexible potentiometers having a first portion which is non moveable relative to said first contact surface and positioned to register with said first contact surface of one of said first extensions, and each of said plurality of flexible potentiometers having a second portion with a free end, said free end of each of said flexible potentiometers being free and cantilevered with said free end extending away from said first portion into a respective said first space proximate said first extension for deflection by a said second extension toward and away from said first space for varying the electrical resistance of each of said plurality of flexible potentiometers upon movement of said steering wheel hub cover between said at-rest position and said active position;

activation circuitry conductively connected to said horn to activate the horn when the activation circuitry receives an activation signal; and analyzing circuitry conductively connected to said plurality of flexible potentiometers and to the activation circuitry, said analyzing circuitry generating and supplying the activation signal to the activation circuitry in response to the change in resistance of a flexible potentiometer of said plurality of flexible potentiometers upon movement of said steering wheel hub cover between the said at-rest position and the said active position.

10. The horn activation system of claim 9 wherein said plurality of flexible potentiometers are connected in electrical series.

* * * * *